June 16, 1936.   W. B. D. PENNIMAN   2,044,014
PROCESS OF MAKING OXIDIZED PRODUCTS
Filed May 20, 1925   2 Sheets-Sheet 1

Fig.1.

Inventor
William B. D. Penniman

By Sol Shappirio   Attorney

June 16, 1936. W. B. D. PENNIMAN 2,044,014
PROCESS OF MAKING OXIDIZED PRODUCTS
Filed May 20, 1925 2 Sheets-Sheet 2

Inventor
William B. D. Penniman
By Sol Shappirio
Attorney

Patented June 16, 1936

2,044,014

UNITED STATES PATENT OFFICE 2,044,014

PROCESS OF MAKING OXIDIZED PRODUCTS

William B. D. Penniman, Baltimore, Md.

Application May 20, 1925, Serial No. 31,713

26 Claims. (Cl. 196—142)

This invention relates to a method of oxidizing organic substances, especially mixed or composite materials such as oils, pitches and tars rich in combined carbon, in a heated state and under pressure, employing an oxidizing agent in gaseous form, preferably air, with the substance to be oxidized preferably present substantially in excess; whereby oxidation of a selective character instead of ordinary complete combustion is effected in large measure and products of great industrial significance result. The invention further relates to the products of such oxidation insofar as these concern the preferred or illustrative embodiment hereunder; namely the treatment of hydrocarbons, specifically those of the mineral or petroleum type. My process enables the production in varying proportions of alcohols, aldehydes, ketones, fatty acids, phenoloid bodies and solvents, a portion of the latter being soluble and another portion being insoluble in water. The water-soluble portion includes such bodies as alcohols, ketones and the like and the water-insoluble portion includes a light fraction available as an extraction solvent but of especial and notable value as a motor fuel for internal combustion engines, a fraction utilizable as a varnish thinner or vehicle, and heavier water-insoluble products or oils utilizable in various ways, e. g. as burning oils, fuels, flotation oils and the like. This application is a continuation in part of Serial Nos. 299,213; 526,707; 541,525 (now U. S. Patent 1,922,322) and 541,526.

In accordance with the present invention oxidized products are prepared by contacting an oxidizing gaseous medium with the substance to be oxidized under relatively high pressure. Preferably the oxidizing gaseous medium such as air is passed through the substance in a liquid condition exposed to heat and pressure. Under such conditions as will be more specifically hereinafter set forth oxidation takes place in a predetermined manner and the products of oxidation or some part thereof are volatilized and carried away in the current of spent gas; the nitrogen of the deoxygenated air serving as a stripping agent, assisting in removing the products from the zone of the reaction.

In the practice of my invention the substances which I prefer to treat are those which will exist in a liquid or sufficiently fluent state to allow air or other oxidizing gas to bubble therethrough, under the desired temperature and pressure. Preferably I employ a deep layer or pool of the raw material in a liquid or molten state, into which layer or pool, air is injected preferably near the bottom and bubbling upwardly through the hot liquid supplies oxygen to the latter while at the same time bringing about a certain amount of agitation, thus creating a circulation which enables all portions of the liquid to be brought advantageously into contact with the air jets or bubbles of air therefrom. It is of course possible to bring about agitation by special mechanical devices and such procedure is not precluded but is not recommended for the high pressure operation forming the preferred procedure hereunder. Baffles may be interposed in the liquid layer to delay the upward travel of the air bubbles, furnishing obstructions to its course in addition to the obstructing effect of the liquid or any solid matter such as carbon which may be suspended therein. The layer or column of oil preferably should be deep enough to rather completely deoxygenate the air during the period of its travel therethrough. A layer at least 2 or 3 feet in depth therefore is preferably employed but the precise rate of deoxygenation will vary with the pressure and other conditions. By complete or substantially complete deoxygenation in this manner the inflammable vapors arising from the oil layer or column are not in contact with oxygen in any material amount thereby eliminating a hazard of operation.

As noted the substances which I particularly propose to treat are those rich in combined carbon and in general hydrocarbon mixtures of low grade such as crude petroleum and its various distillates, shale products and tars, pitches, waxes, sludges and residues of the petroleum industry; asphaltic oils, malthas, asphalt, cracked oils and residues from cracking stills, wood tar oils and wood tars, peat distillates, lignite distillates and in some cases oils and tars resulting from the destructive distillation of coal; also oils e. g. petroleum oil containing solid substances in suspension such as powdered coal, coke, peat and other oxidizable materials. Thus finely divided bituminous coal may be suspended in petroleum and subjected to the oxidation step as hereinafter described. Other substances, either solid or liquefiable by heating, may be added to the oil forming the base raw material of oxidation. Ordinarily it is inadvisable to admix substances which are readily oxidized with those which are oxidized with great difficulty as the conditions of temperature and pressure usually should be varied to secure advantageous conversion, specific in each case. However the transformation of one raw material undergoing oxidation with relative ease may facilitate the oxidation of a substance of more difficult oxidizability and therefore I do not preclude the employment of mixtures of substantially dissimilar oxidizing rates especially when one substance has a stimulating effect on the oxidation of the other.

A protracted series of experiments and tests have shown that my process is especially applicable to the treatment of cheap petroleum oils in a liquid state, by bubbling the air or other gaseous oxidizing agent, under heat and pressure, therethrough. In this simple and as I have found efficient manner there may be established the preferred oxidizing condition in accordance with which the oil to be oxidized is present in predominant proportions; preferably being fed continuously into the charge in the oxidizing zone; thus reducing to a minimum the occurrence of ordinary destructive combustion, allowing the formation of valuable products of oxidation and substantially eliminating the hazard of explosive conditions which might prevail should oxygen be present in predominating proportions. In view of the richness of petroleum in combined carbon and the adaptability of the process to the treatment of petroleum (mineral oils) and petroleum products in general as noted in the foregoing I consider the controlled oxidation of petroleum to represent the preferred embodiment of the present invention. Hence the illustrations hereinafter given set forth petroleum as the typical raw material. The term petroleum however is employed in a generic sense to embrace mineral or earth oils and solid hydrocarbons.

When the process is applied to certain petroleum oils containing a considerable proportion of sulphur the oxygen may serve in part at least as a desulphurizing agent, by oxidizing the sulphur to yield sulphur dioxide. Thus distillates of relatively low combined sulphur content may be obtained. This reaction tends to simplify refining operations involving the elimination of sulphur. The sulphur dioxide may be collected and converted into bisulphite solution or into any other suitable form. As the bisulphite it may be used to extract ketones or aldehydes in the subsequent operation of treating and separating the useful products of oxidation. To the extent that sulphur is oxidized in this manner heat is developed in the oxidation zone and assists to the same degree of its development in the maintenance of the temperature of the reaction chamber. Hence oxidation reactions of this character are advantageous not only from the standpoint of effecting desulphurization but also that of obtaining heat useful in the operation through the destruction of a deleterious substance. Any heat developed in this manner will lessen the heat required to be developed through the oxidation of desirable hydrocarbons. In some cases sulphur may be added either for its calorfic or chemical effect.

In the practice of one phase of my invention I have particularly in mind the possibility of oxidizing finely divided carbon formed as a part of the general oxidation process applied to petroleum and the like. In this way I may supply to the reaction chamber a certain amount of heat while eliminating some of the carbon which otherwise would remain in the spent sludge or tar drawn from the oxidation chamber. In passing it may be noted that the cracking of heavy petroleum oils in direct fired stills gives much trouble through the separation of carbon which sticks to the bottom of the still and forms a graphitic layer causing overheating and burning out of the still bottoms. When employing high pressures in cracking the problem is a serious one to find a sufficiently resistant steel in the construction of the still bottom. In the present invention such carbon as is formed will at the time of its liberation be in a very finely divided state which no doubt in part at least is colloidal and the oxygen-containing gas passing up through the oil column comes in contact with these particles and is adsorbed. As a result the carbon may thus be oxidized selectively in greater or lesser degree, yielding a quota of heat for the maintenance of the temperature of the reaction zone. To the extent that heat is thus supplied by the oxidation of carbon useful work is performed. If the object is to secure from petroleum a substantial proportion of lighter hydrocarbons and a minor degree of oxidation, the heat supplied by the combustion of carbon calls for less oxidation of the hydrocarbons themselves. With this tendency to oxidation of the very fine colloidal carbon I have therefore the opportunity of filtering the tar or spent oil withdrawn from the oxidation zone thus removing the coarser carbon which may be present and returning the filtered oil to the oxidation chamber.

There exists within the range of utility of my process the step of treating the residual oils from ordinary cracking stills; oils which have already been subjected to drastic treatment under heat and pressure for the purpose of obtaining the maximum amount of so-called cracked gasoline. Spent oils of this character which no longer can be further disintegrated by ordinary pressure cracking methods may be subjected to oxidation treatment in accordance with my process to yield products of cleavage and oxidation. The addition of fresh petroleum oil to the spent oil before subjecting to oxidation is not precluded.

As is apparent from the foregoing the oxidizing agent employed preferably is ordinary air, utilized without drying or modifying the normal moisture content as it may vary from time to time. Or it may be dried if desired to a uniform degree of humidity. Likewise for special purposes moisture, for example as steam may be introduced with the air blast. When the pressure required to prevent premature volatilization of the oil is so great that the consequent pressure of the incoming air yields too drastic a degree of oxidation, the air may be diluted with steam or diluent gases such as products of combustion, or with deoxygenated air discharged from the condensing apparatus. The enrichment or impoverishment of this entering air is also determined by the character of the oil or the products needed. On the other hand when treating highly resistant organic material such as the spent oils from cracking stills or for securing deep-seated oxidizing effects the air may be enriched with oxygen. Pure oxygen obtained for example by the liquefaction of air could be used in this manner. Air at ordinary atmospheric temperatures may be used but in most cases I prefer to preheat the air to a considerable degree. Since my process of oxidation is preferably carried out at relatively high pressures, usually exceeding ten atmospheres and frequently considerably higher, the air is normally sufficiently preheated by the compression to which it is subjected in order to force it into the obstructing layer or column of oil in the oxidizing zone. The temperature may be further increased in some cases by having the compressed air travel through a heat interchanger before entrance into the reaction chamber. The heat interchanger may be arranged to utilize some of the heat of the outgoing gases and vapors. In some cases a coil may be placed in the upper part of the reaction chamber through which the air travels before entering the oil. The air thus compressed and preheated preferably is introduced into the oxidizing chamber in the lower part where it is forced through the column of oil, preferably through distributing devices which cause the air to be projected into the oil as fine jets or bubbles. On entering the oil the air bubbles encounter the resistance of preferably a deep column of said oil and this obstructing effect is oftentimes enhanced by the presence of carbon or other solid materials. The fine bubbles of air therefore may travel rather slowly upward through the pool of oil. As previously noted the rate of travel may be retarded to an additional degree by the employment of baffles or other devices arranged to hinder such upward flow. If the baffles are arranged in a manner to bring about a circulation of the oil which tends to cause the carbon and other separated solid material to collect to a considerable degree in the lower part of the reaction chamber this is advantageous as the tarry material or heavy liquid products remaining from the reaction may be drawn off at the lower part of the chamber, either continuously or intermittently, as desired.

Variations in the gaseous oxidizing agent, for example by dilution with air or enrichment with oxygen, the influence of pressure and temperature and so forth enable the oxidation and other chemical changes to be oriented to a considerable degree despite the complexity of such bodies as petroleum and other oils. In the cleavage of hydrocarbons of high molecular weight when exposed to heat, while accompanied by exposure to oxidizing agents products of lower molecular weight some of which are more stable than others will form. There is therefore a tendency for the more stable bodies to accumulate. If sufficiently volatile these will be carried away in the stream of deoxygenated air to the condensers or absorbers. If non-volatile under the conditions of treatment they may remain unchanged in the oil and be drawn off with the sludge, from which such products may be recovered by suitable treatment. Or yielding to further and continued oxidation they may break down further. Under one set of conditions a maximum yield of water-insoluble products containing a substantial proportion of components available for motor fuel purposes will result whereas under a different set of conditions there may be an increased yield of more highly oxidized products for example those of a water-soluble character such as the lower fatty acids, lower aldehydes, solvents and the like.

Chemical oxidizing agents such as metallic peroxides, hydrogen peroxide, bichromates, permanganates and the like are very costly, others less expensive such as bleaching powder, nitric acids and so forth are liable to bring about objectionable secondary reactions, e. g. chlorination, rapid corrosion of containers or formation of explosive nitro compounds. In my preferred procedure a cheap oxidizing agent, namely compressed air is used with the derived advantages of availability of the oxidizer, simplicity of treatment and relative freedom from objectionable or destructive side reactions. By employing compressed air I increase the concentration of oxygen in the oxidizing chamber and bring about a degree of chemical change in a predetermined or regulated manner which is surprising and of great commercial significance.

For each substance there exists a critical pressure or more strictly a critical range of pressure yielding a maximum proportion of specially desired products of oxidation. Beneath this range inadequate yields or indifferent results appear while above the range there is danger of destructive effect, through condensation, polymerization and so forth.

If the raw material is very cheap such a degree of destruction is not always as serious, since other effects such as the spontaneous development of heat useful in the reaction or the elimination of some impurity, e. g., sulphur or carbon may determine the conditions imposed, and pressures within the critical range at the approved temperature may therefore not always be required. However I prefer to approximate this range. Likewise there exists a critical temperature or range of temperature at or within which the maximum yield of particular products may be expected. In some cases this range is a broad one for example between 300 and 1000° F. A narrower and more effective range is that between 600 and 900° F. For the treatment of petroleum oils to obtain oxidized products and especially motor fuels substantially free from knocking qualities when used in internal combustion engines I preferably employ a temperature between 700° and 850° F.

Restated, the process in its preferred form is that of passing air at the critical oxidizing pressure and temperature or within a range which embraces such critical pressures and temperatures, through the substance to be oxidized, which is present in a liquid form or as a suspension in an appropriate liquid or molten material, and separating from the spent air current the desired products of oxidation and entrainment.

From the residues of oxidation, products which are non-volatile under the pressure conditions imposed or are not entrained by the spent air current but which have been oxidized to a degree that they constitute chemical derivatives of value may be separated by appropriate extraction methods.

Pressures of not merely a few pounds above atmospheric but of several hundred pounds or higher invoke conditions of great moment with respect to the orientation of oxidation. At low pressures air acts as an entraining rather than a sheer oxidizing agent while at high pressures its oxidizing activity is surprisingly enhanced and the entrainment of heavy unoxidized bodies becomes a minor occurrence. This is a desirable condition to create since it permits oxidation to continue on the substances not oxidized or sufficiently oxidized while products of lower molecular weight and of greater volatility or more easily sublimed will be removed from the zone of oxidation and further conversion arrested. As the pressure is increased the entrainment tends to diminish and may become a negligible factor with respect to the unoxidized bodies present in the reaction zone.

The spent air current or deoxygenated air therefore acts as a sweeping-out or purging agent to remove lighter bodies from the zone of oxidation and to prevent destructive oxidation to such ultimate products as carbon monoxide or carbon dioxide.

The employment of high pressures has the additional advantage that a comparatively small volume of gas is required to effect oxidation. This allows for more compact apparatus, piping and the like. Furthermore the degree of entrainment is much less when the volume of gas is reduced. Entrainment which removes the products of oxidation from the reaction zone is desirable but too great a degree thereof carries away from the reaction chamber a large proportion of the raw material which subsequently has to be separated from the products of oxidation and oftentimes this is not an economical procedure. By the employment of the highly compressed gas diminished by pressure to say one-twentieth or one-fiftieth the volume that it would occupy at ordinary atmospheric pressure, the degree of ebullition, spraying and foaming is greatly reduced.

A bubble of air exposed to a pressure of 300 pounds above atmospheric has twenty times more oxygen at its reacting surface than at ordinary atmospheric pressure. At 900 pounds pressure the oxygen at the surface is sixty times greater and at 3000 pounds pressure there is present two hundred times more oxygen.

Thus as the bubble passes through the hot material which is being oxidized the number of oxygen molecules ranged along the surface of the bubble for attack on the raw material is greatly altered by pressure and new and surprising effects are obtained by such alteration.

With some substances extremely high pressures may cause too extensive oxidation. On the other hand pressures only slightly above atmospheric would bring about little or no action and the oxidation would proceed at so slow a rate that the process would have little commercial interest.

Aside from the effect of any finely-divided carbon present in the oil there may be added special activating substances such as aluminum chloride, the oxides of manganese, lead, iron, chromium, vanadium, zinc, copper, or calcium and the like to assist in the oxidation; such substances ordinarily being introduced in small or catalytic proportions. Larger amounts of alkaline substances or bodies having a neutralizing effect such as quick lime, lime stone or carbonated alkali may be added in some cases. In general however for carrying out the reaction on petroleum oils I do not require any catalytic or activating substance. This is especially true when treating native petroleum or its fractions which have been unchanged by cracking or otherwise. Catalysts however sometimes may be used more advantageously on rather resistant coal tar distillates, spent oils from cracking stills, and similar raw materials which have experienced a treatment which tends to render them normally more stable and therefore less easily attacked by oxygen.

The oxidizing chamber may be of heavy steel plate which if desired may be of chromium steel or chromium nickel steel or other material fairly resistant to the attack of sulphur, sulphur dioxide and organic acids. The chamber preferably is cylindrical with concave or convex heads to withstand the high pressures employed in accordance with the preferred embodiment. In appearance it may resemble an ordinary direct-fired oil still. The cylinder may be placed horizontally or vertically. In the latter position a single distributor placed at or near the bottom ordinarily will serve for the admission and distribution of compressed air. In the horizontal form the air may be introduced through a perforated pipe situated along the bottom and extending from end to end of the oxidation chamber. The movement of air upwardly through the oil causes the latter to swirl and circulate in a brisk manner, upwardly, then outwardly towards the walls of the vessel and finally downwardly toward the source of air supply. Such circulation is effective in bringing about good contact between the oil under pressure and the compressed air supplied to it. The air jets may also be so arranged that the movement of oil within the still is such that the heavier products are segregated in a selected portion of the still itself or an attachment thereto. The motive power of the air may also be utilized before or after discharge to move paddles or other mechanical devices as may be desirable for the same purposes. The deoxygenated air and gases may be used to propel fresh air into the oxidation zone.

There need be no fire-box or other provision for continuously heating the oxidizing chamber. The latter is preferably a "fireless still" the temperature of which is maintained solely by the heat of oxidation generated within the thick layer or column of oil, or preferably jointly by the heat of oxidation and the heat supplied by the compression of the air supply; or by specially-fired preheaters for the oil and/or air.

However the foregoing does not preclude the employment of oxidizing chambers equipped with fire-boxes if these are desired. The latter for example may be used only during the initial or "starting-up" period. When the oil has been heated sufficiently so that the oxygen of air will react with it, the blast of preheated air may be turned on and heat is thenceforth spontaneously generated in the oil. Thereafter the fire on the grate may be kept at a low point or allowed to subside entirely.

Using a "fireless still" without fire-box equipment the oil may be heated in a convenient receptacle to a temperature of say 500 or 600° F. and then charged into the oxidizing chamber. Air, preferably preheated is introduced and with an effective pressure in the chamber the oil begins to oxidize and the temperature will rise to say 700 or 750° F. remaining at that point by adjustment of air supply, the degree of preheat thereof and the continuous introduction of preheated raw oil. In short, once an initial charge of oil has been heated to oxidizing temperature in a chamber continuously supplied with oil no further application of heat by means of fire-box appurtenances is required.

The employment of a continuous feed of raw oil is not without advantages. The level of the oil in the oxidizing chamber may be kept fairly constant thus maintaining a column of oil of deoxygenating depth; that is of a depth sufficient to permit of the removal from the air supply of all or most of its oxygen during the course of travel from the point of its ingress to the surface of the oil. It is desirable also to withdraw a portion of the oil continuously from the reaction pool, preferably from the lower part. The rate of withdrawal may be adjusted with respect to the rate of feed of the oil into the chamber to avoid departing materially from a constant level. Instead of continuous feed and discharge the operation may be intermittent "portionwise"

e. g. frequent alternation of feeding in portions and withdrawing portions without substantially disturbing the constant level conditions of the reaction pool.

The introduction of fresh raw oil into the still serves to maintain a degree of constancy of oxidizing conditions which is desirable. The contents of the chamber remain more uniform than when a charge of oil is placed in a receptacle and blown with air until action substantially ceases. With continuous feed of oil or its equivalent the air is at all times acting on a mixture of fresh oil and of oil which has been modified through reaction. Continuous introduction and withdrawal thus suffice to obtain that relatively constant composition which is important in securing uniformity of heat development and effective supervision of the apparatus.

The intermittent or batch process yields constantly changing conditions as oxidation progresses and finally comes substantially to a standstill. In this case the conditions of operation are constantly changing and there is less effective control with variable conditions of heat development. Therefore while certain features of the present invention may be practiced by the intermittent process it does not constitute the preferred embodiment.

The continuous feed of oil also brings about a safer character of operation in that there is always present an abundance of fresh raw oil to which the oxygen has access and therefore the risk of collection of an excess of oxygen at any one point to bring about violent local reactions is minimized. The employment of an "average pool" of oil therefore constitutes what I consider to be a very desirable feature of the preferred form of my invention.

Condensation of the vapors is preferably carried out under a pressure above atmospheric, normally approximating the same pressure as that of the oxidizing chamber. Condensers may therefore be in open communication with the oxidizing chamber and such pressure drop as may be observed in the different parts of the condensing apparatus will be simply that due to condensation and loss of pressure by friction. However there may be provided a shut-off valve or a check-valve between the still and condensers of the several sections of the latter to cut off any desired units or to reduce the pressure therein. Condensation at atmospheric pressure is not precluded and the employment of silica gel, absorbent carbon or similar absorptive agent is considered advantageous in the treatment of the tail gases to remove residual vapors such as light aldehydes and very volatile hydrocarbons. The tail gases thus treated will be found to contain a very high proportion of nitrogen which may be purified and used in admixture with hydrogen to make synthetic ammonia.

When properly deoxygenated the tail gases will contain little or no oxygen, carbon dioxide will be present in moderate amounts and sometimes a small proportion of carbon monoxide may be present.

The condensate is acid due to a variety of organic acids, which may include formic, acetic, propionic, butyric and higher fatty acids of this series, also unsaturated acids e. g. acrylic, aromatic acids, e. g. phthalic acid or anhydride. Sulphur dioxide also may be present. Hence I prefer to construct condensers or at least that portion in which the acids condense, of material, e. g. copper, chrome steel, nickel chrome steel, Monel metal and the like notably resistant to organic acids. The employment of enamel-lined condenser tubes is not precluded.

The products of oxidation, distillation and condensation as noted will be found to be made up of an emulsion which may stratify to form an upper layer of oily character and a lower layer of a water solution of organic substances. The emulsion or two layer condensate is highly charged with gas particularly when pressure condensation has been used. The upper layer which contains water immiscible substances is hereinafter referred to as "motor distillate". Each of these distillates may be worked up in a number of ways to produce valuable commercial products. As previously indicated the character of the distillate is determined by a number of factors, the most important of which are indicated below:

First, character of hydrocarbon used;
Second, pressure maintained in the still;
Third, rate and rapidity of the entering air and any additions thereto;
Fourth, the temperature maintained in the still;
Fifth, the temperature maintained in the reflux head;
Sixth, mode of condensation.

The products of oxidation, distillation, and condensation thus attained are hereinafter referred to as "oxygenated and disintegrated" products.

Apparatus which may be desirably used is shown in the accompanying drawings, wherein.

Figure 1:
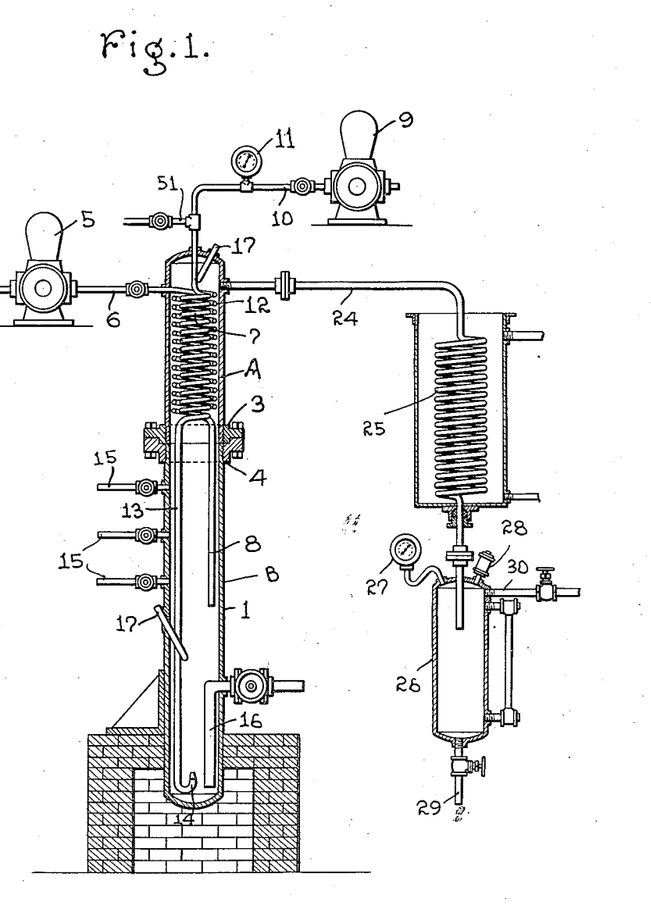
Fig. 1 is a diagrammatic section or elevation.

Referring to Fig. 1, the apparatus consists of an upright still or drum having heavy walls adequate to sustain a pressure of three hundred pounds or more per square inch. The still is preferably made in two sections A and B, secured together by companion flanges, 3, 4, and suitable bolts. The still is mounted above a gas-fired furnace of any suitable construction. Oil is introduced into the still by a pressure pump 5, from which leads a delivery pipe 6, having within the still head, a coil 7, and a depending delivery pipe 8. Air is forced into the still from a pump 9, through pipe 10, having a pressure gauge 11, coil 12 (within the still), and depending pipe 13 provided at its lower end which is near the bottom of the still, with an upwardly directed delivery nozzle 14. Blow-cocks 15, enable the level of the oil in the still to be ascertained. 16 is a block-off line through which residual material is removed. 17, 17 are thermometer wells. 24 is a vapor line leading to a condenser coil 25, which is connected to collecting tank 26 provided with a pressure gauge 27, and safety valve 28. The liquid collected in tank 26, is delivered through pipe 30, suitable storage or collecting vessels of course, being connected to pipes 29 and 30.

Figure 2:
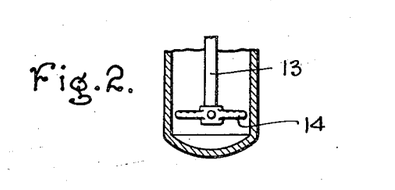
Fig. 2 is a modified form of air nozzle.

Only one air delivery pipe has been shown but as many more as are necessary, are used in stills of larger diameter than that shown. A modified form of air nozzle is shown in Figure 2, in which a number of radiating pipes 14, provided with apertures in their upper surfaces, are secured to the end of the air pipe 13.

Figure 3:
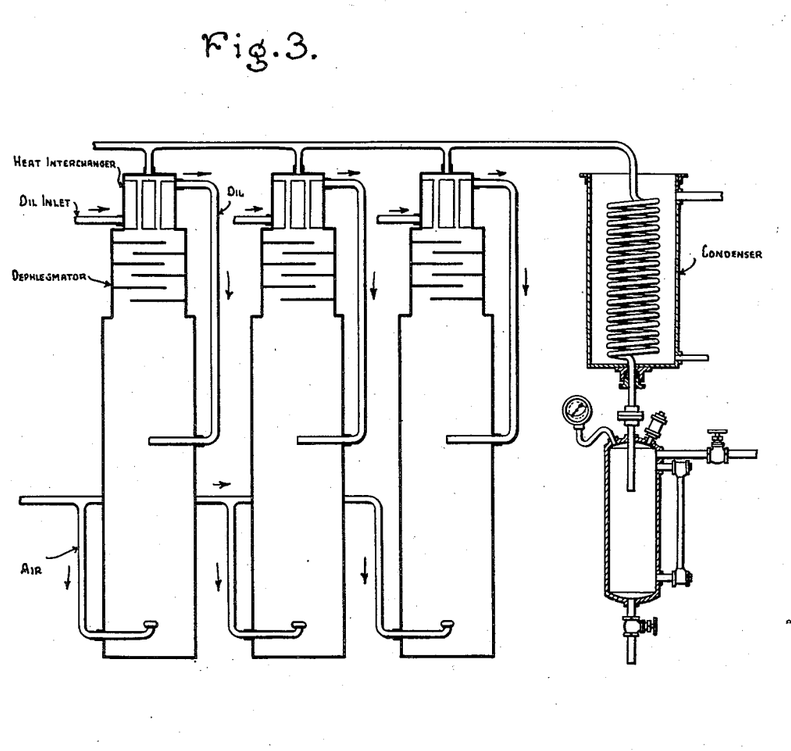
Fig. 3 is a diagrammatic sectional elevation of a modified arrangement of the apparatus elements.

In Figure 3 there is shown a battery of stills comprising a plurality of reaction chambers, dephlegmators and heat interchangers connected to a condenser train common to all of said chambers.

In order to illustrate the invention herein set forth the following typical run is given, but it will be understood that this is merely one example of how the process may be carried out and of the nature of the products that may be obtained, since many changes therein may be made by those skilled in the art without departing from the scope and the spirit of this invention.

The hydrocarbon used was a Mid-Continental gas oil containing about one percent of sulphur, and having the following characteristics:

Specific gravity at 60° F.—38.3° Bé.

| Distillation | Oil | Vapor |
|---|---|---|
| | °F. | °F. |
| Initial boiling point | 552 | 432 |
| Temp. 10% distilling | 582 | 525 |
| Temp. 20% distilling | 600 | 558 |
| Temp. 30% distilling | 615 | 575 |
| Temp. 40% distilling | 631 | 592 |
| Temp. 50% distilling | 645 | 608 |
| Temp. 60% distilling | 661 | 624 |
| Temp. 70% distilling | 671 | 642 |
| Temp. 80% distilling | 701 | 666 |

The still used was a vertical one, four feet in diameter and twenty-six feet high. The air jets were three feet from the bottom of the still. A cooling coil on the head of the still was arranged so that the vapors and gases passing to the condenser were maintained at a temperature of 315° F. The oil was preheated to 500° F. before the still was operated. The still contents of 23 barrels was maintained during the run. The pressure in the still was approximately 300 pounds per sq. in. during the run and the air used was about 300 cubic feet per minute, the pump pressure being about 350 pounds. After the air was turned into the still, the temperature rose from 500° F. to approximately 725° F. to 750° F. Distillation was evident soon after the air was turned into the still. The rate of distillation increased as the still and its contents heated up, but after the desired range of temperature was reached, it was kept approximately constant during the run by evident slight manipulation of the entering air, oil and sludge withdrawal. The charging oil was in part new oil and in part oil that had been separated from the sludge of the previous run. The average input and output of the still per hour were as follows:

Oil 100%
4 bbls. per hour
Net oil used
4—1.4=2.6 bbls.

{ Carbon dioxide and water equivalent to 7 gallons of oil
Volatile hydrocarbons escaping an ordinary condenser equivalent to 1 gallon of oil.
Water soluble organic compounds equivalent to ¼ bbl. of oil:—acetaldehyde 67% and solvents to 80° C.
Acid and gum 33%
Gasoline Distillate—equivalent to 2.66 bbls. of oil yielding over 2 bbls. of finished gasoline.
Carbon equivalent to 1/16 bbl. of oil
Oil returned to system:—
  1 bbl. after carbon separation; and .4 bbls. from gasoline distillate, etc. }

The distillate obtained during this test as it runs from the condenser is an emulsion highly charged with gas, and is referred to as "intermediate distillate". It was run into a wooden tank and allowed to stand until a fairly sharp separation into two layers took place. Separation in the receiver under pressure is usually much slower. This separation results in an upper layer containing water immiscible substances, and a lower layer containing a water solution of organic substances. But since some of the constituents are mutually soluble, there is a distribution of these mutually soluble substances between the two layers. Some of the valuable organic substances found in the lower layer, can be obtained from the upper layer by washing the latter with water, the amount of water used being carefully proportioned so as to avoid an undue dilution of the organic material that ought to be recovered. Washing several times using from 3 to 10% of water for each wash effects a satisfactory separation. These water washes from the upper layer are added to the lower layer.

In the typical case given above as an illustration the intermediate distillate was separated into two portions: the upper layer containing the water insoluble crude oxidized distillate and the lower layer containing the water soluble crude oxidized distillate. The following methods used for treating these distillates to recover valuable products therefrom are exemplary only and not limiting in any way.

A portion of the water insoluble crude oxidized distillate was treated with ten percent caustic soda solution in an agitator for about one hour. Acids, phenols, aldehydes, etc. which are present are dissolved, and can be separated from the caustic solution in a variety of ways. Another portion was first treated with a ten percent solution of carbonate of soda to remove the acids, and then with caustic soda to withdraw the aldehydes (as gum) and the phenoloid bodies. In a third portion, the aldehydes were first largely withdrawn by means of a concentrated solution of sodium bisulphite, the other desirable substances being subsequently removed by the use of methods analogous to those set forth above.

Following the treatment with caustic soda the material may be washed with water and then treated with a small portion of sulphuric acid. If strong acid is used it is advantageous to keep the temperature low during such treatment, while with more dilute acid the temperatures may be higher. The crude water insoluble distillate was then distilled in a fire still, although a steam still may be used, the distillate up to 400° F. being separately collected. A further fraction taken between 400° F. and 500° F. may also be utilized.

This fraction up to 400° F. is a gasoline substitute which differs markedly in its properties from the ordinary commercial varieties of gasoline. Such differences are present in both the physical and chemical properties due without doubt to the fact that whereas, in ordinary or cracked gasoline there is little or no oxygen, the gasoline substitute referred to above contains oxygen, which may amount to 3% or more. It has a characteristic odor. Further, this motor fluid will stand a high compression in the motor cylinder without premature ignition. It is also readily soluble in ordinary 95% alcohol in all proportions and can be mixed with ordinary gasoline, benzol, acetone, and organic liquids in general. Blended fuels may thus be made. The residue remaining in the still after removal of the volatiles therefrom in this treatment of the motor distillate, is desirably returned to the oxygenation still for retreatment.

The sulphuric acid material derived as set forth above is substantially different in its properties from the acid sludges obtained by treating ordinary petroleum and its distillates. This is due to the presence of alcohol in the crude oxidized distillate insoluble in water, which alcohol combines with sulphuric acid in a manner different from that of the unsaturated substances predominating in straight petroleum distillates. This novel sulphuric acid sludge is diluted with water and steam stilled. The alcohols which are distilled off and the organic residue that remains in the still may both be utilized.

Other methods for treating the crude water insoluble oxidized distillate may be used. For example, this so called "motor distillate" may be purified by passing it through fuller's earth, silica gel or heated bauxite. Or in another method of treatment the distillate may be redistilled with aluminum chloride. Or again in order to separate aldehydes particularly, the distillate after treatment with sodium carbonate and sometimes after the caustic soda treatment, may be distilled with aniline in amount equal to 5% for example, or with phenol, either being used in any required proportion.

The water soluble crude oxidized distillate was separated as set forth above from the water immiscible content of the intermediate distillate. This water solution of organic substances was found to contain approximately 18% of organic material of the following composition: 3% of acids, mostly acetic, with indications of dibasic acids; 7% of aldehydes, principally acetaldehyde and propionaldehyde; 3% of ketones including acetone; and 5% of alcohols, both saturated and unsaturated. This water solution was treated as follows: 15 bbls. were placed in a copper still provided with a high fractionating column. 12 fractions of 7 gallons each were taken from this still ranging in boiling point from about 20° C. to 95° C. The first and second fractions consisted of practically pure acetaldehyde, the last fraction containing however a considerable quantity of water. The intermediate fractions contained only small amounts of water and the boiling points ranged up to 85° C. These distillates are rather complex and have been found to contain aldehydes, ketones, alcohols, and acids as well as unsaturated compounds and compounds formed by combination of the substances just mentioned. Acetaldehyde is very readily separated by distillation. The third to the twelfth distillate fractions inclusive were treated with caustic soda solution and redistilled. The caustic soda acted to fix the aldehydes and acids and perhaps other substances leaving a resultant "white solvent" of boiling point range from 45° C. to 85° C. This white solvent amounted to about two-thirds of the organic matter present in the original water solution of organic substances obtained from the intermediate distillate. It is a clear, transparent liquid with a pleasant odor. It mixes in all proportions with water, alcohol, ether, benzol, and petroleum. It mixes with gasoline in all proportions and gives to the latter anti-knock properties. It also mixes with kerosene and reduces its knocking properties in the motor. This "white solvent" or fractions thereof is a solvent for shellac, gums, nitrocellulose and cellulose esters in general, and when the alcohols present are combined with organic acids the solvent properties are improved for many purposes.

The "white solvent" or fractions thereof can also be used for the extraction of fats and medicinal principles.

The neutral or alkaline still residue remaining after the "white solvent" separation was treated with sulphuric acid until acid whereupon substances combined or dissolved by the soda solution were set free. It was then steam stilled and the organic distillate reworked. The residual gummy liquid which is insoluble in water is first washed and then may be combined with aniline or its isomers, hydrazine or its isomers, phenol or its isomers, or a combination of them, in either acid or alkaline condition. The gummy liquid if dried and subjected to heat treatment can be used for making gums of varying hardness as may be desired. The gum can also be used in admixture with other gums and substances.

A portion of the caustic soda solution used in the treatment of the crude oxidized distillate insoluble in water was also worked up by acidifying it and steam stilling it. The distillate contains the volatile fatty acids and phenoloid bodies which are readily separated by carbonate of soda. The residual gummy substance which remains is utilized in the same manner as the gummy liquid obtained from the water solution referred to above.

The oil which is withdrawn from the main treatment still during the pressure oxygenation and disintegration and any residue in this still, contains oxygenated derivatives and may be worked up to separate fatty acids for example, but is preferably returned to the still for retreatment.

The various factors set forth above for controlling the character of the distillate are easily adjusted so that the "run back" of the still is reduced to a minimum. The process may be made practically continuous. The carbon formed during the process may be withdrawn from the bottom of the still from time to time, generally once an hour, and oil supplied continuously. The position of the air nozzle controlling the point of entry of air into the liquid hydrocarbon undergoing treatment is one factor affecting the recovery of carbon from the still.

In general, it should be noted that the process of pressure oxygenation and disintegration herein set forth is essentially different in character from the cracking processes etc. heretofore known to the art. The products produced in the instant process strikingly emphasize this differentiation. Furthermore, in the present process, it is possible to obtain yields of more than 100% based on the treated oil since there is a combination of oxygen during the treatment.

While the process as set forth above is exemplified by the treatment of hydrocarbon material, such material may be given a chemical treatment to produce chlorinated, nitrated, sulphated or other derivatives in the material before it is subjected to the pressure oxidation referred to above.

In utilizing the vapors and gases which are swept out of the oxidation and disintegration chamber by the current of deoxygenated air or in other ways, the typical example as given above, makes use of condensation, desirably pressure condensation. During the working up of some of the products obtained from this intermediate distillate by distillation sub-processes, it is sometimes found to be desirable to use condensers supplied with brine instead of with water.

And while as set forth above, condensation is one desirable method of treating these effluent vapors and gases from the oxidation zone, they may also be treated advantageously by other methods, either chemical, physical, or both, in order to produce valuable products therefrom. For example, they may be subjected to temperature treatments of various kinds; or they may be treated with absorbents or materials such as fuller's earth, bauxite, or silica gel, etc. Or again they may be treated chemically to remove or to modify the components or some of them only, of the gases and vapors. Such treatments may be applied both before and after condensation, and either to the entire gaseous and vaporous product, or to selected portions thereof.

Further, the effluent gases and vapors may be subjected to the action of a distilling head which latter acts either as a preheater, or acts to return all or a portion of the material evolved from the still to the still for further treatment or to a supplementary still or vessel for supplementary treatment.

The chemical and physical treatments set forth above may be carried out in towers under superatmospheric pressure if desired.

Having thus set forth my invention, I claim:

1. The process of decomposing hydrocarbon materials in a substantially liquid state, which comprises heating a flowing stream of the liquid to a temperature of about 300 to 700° F., passing the heated liquid into a converting vessel under substantial super-atmospheric pressure, introducing a free oxygen containing gas into the body of the liquid, preventing loss of heat from the vessel to maintain temperature of about 750° F. or higher therein, removing the generated vapors and condensing therefrom the less volatile constituents, returning the hot condensate without further heating to the vessel to undergo further decomposition, and withdrawing residual liquid from the bottom of the vessel.

2. The process of decomposing hydrocarbon materials in a substantially liquid state, which comprises heating a flowing stream of the liquid to a temperature of about 300 to 700° F., passing the heated liquid into a converting vessel under substantial super-atmospheric pressure, to form a considerable depth of liquid therein, introducing a free oxygen containing gas at such point in the liquid as to effect substantially complete deoxygenation of the gas, preventing loss of heat from the vessel to maintain temperatures of about 750° F. or higher therein, removing the generated vapors and condensing therefrom the less volatile constituents, returning the hot condensate without further heating to the vessel to undergo further decomposition, and withdrawing residual liquid from the bottom of the vessel.

3. The process of decomposing hydrocarbon materials in a substantially liquid state, which comprises heating a flowing stream of the liquid to a temperature of about 300 to 700° F., treating the heated liquid in a battery of converting vessels under substantial super-atmospheric pressure, while maintaining a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, removing the generated vapors and condensing therefrom the less volatile constituents, returning the condensate to a converting vessel to undergo further decomposition, and withdrawing residual liquid from the bottom of the last vessel.

4. The process of decomposing hydrocarbon materials in a substantially liquid state, which comprises heating a flowing stream of the liquid to a temperature of about 300 to 700° F., continuously treating the heated liquid in a battery of converting vessels under substantial superatmospheric pressure, while maintaining a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, continuously removing the generated vapors and condensing therefrom the less volatile constituents, continuously returning the condensate to a converting vessel to undergo further decomposition, and withdrawing residual liquid from the bottom of the last vessel.

5. The process of decomposing hydrocarbon materials in a substantially liquid state, which comprises heating a flowing stream of the liquid, continuously heating the heated liquid in a battery of converting vessels under substantial super-atmospheric pressure, while maintaining a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, continuously removing the generated vapors and condensing therefrom the less volatile constituents, continuously returning the condensate to a converting vessel to undergo further decomposition, and withdrawing residual liquid from the bottom of the last vessel.

6. The process of decomposing hydrocarbon materials in a substantially liquid state, which comprises heating a flowing stream of the liquid to a temperature of about 300 to 700° F., continuously treating the heated liquid in a battery of converting vessels under substantial super-atmospheric pressure, while maintaining a considerable depth of liquid therein, supplying enough additional heat to each vessel to raise the temperature to about 750° F. or higher through means of the exothermic reaction of a free oxygen containing gas with the hydrocarbon material, removing the generated vapors and condensing therefrom the less volatile constituents, continuously returning the condensate to a converting vessel to undergo further decomposition, and withdrawing residual liquid from the bottom of the last vessel.

7. The process of decomposing hydrocarbon materials in a substantially liquid state, which comprises heating a flowing stream of liquid to a temperature of about 300 to 700° F., continuously treating the heated liquid in a battery of heat insulated converting vessels under substantial super-atmospheric pressure, introducing a free oxygen containing gas into each vessel to react exothermically with the hydrocarbon material therein, whereby enough additional heat is supplied to each vessel to raise the temperature to about 750° F. or higher, removing the generated vapors and condensing therefrom the less volatile constituents, and cyclically returning the condensate while still under pressure for further treatment.

8. The process of decomposing hydrocarbon materials in a substantially liquid state, which comprises heating a flowing stream of the liquid charge, passing it into a converting vessel maintained under substantial super-atmospheric pressure, introducing a free oxygen containing gas into the vessel to react exothermically with the hydrocarbon material therein, but only in such limited quantity as to prevent the evolution of substantial amounts of fixed hydrocarbon gases therefrom, supplying sufficient additional heat in the heating of the charge to maintain the temperature of the mass in the vessel at 750° F. or higher, removing the generated vapors and condensing therefrom the less volatile constituents, returning the hot condensate to the vessel without further heating to undergo further decomposition therein, and withdrawing residual liquid from the bottom of the vessel.

9. The process of decomposing hydrocarbon materials in a substantially liquid state, which comprises heating a flowing stream of the liquid charge, treating it in a battery of converting vessels maintained under substantial superatmospheric pressure, introducing a free oxygen containing gas into each vessel to react exothermically with the hydrocarbon material therein, but only in such limited quantity as to prevent the evolution of substantial amounts of fixed hydrocarbon gases therefrom, supplying sufficient additional heat in the heating of the charge to maintain the temperature of the material in the vessels at 750° F. or higher, removing the generated vapors and condensing therefrom the less volatile constituents, returning the hot condensate to a converting vessel without further heating to undergo further decomposition therein, and withdrawing residual liquid from the bottom of the vessels.

10. The process of decomposing hydrocarbon materials in a substantially liquid state, which comprises heating a flowing stream of the liquid charge, treating it in a battery of converting vessels maintained under substantial superatmospheric pressure, introducing a free oxygen containing gas into each vessel to react exothermically with the hydrocarbon material therein, but only in such limited quantity as to prevent the evolution of substantial amounts of fixed hydrocarbon gases therefrom, supplying sufficient additional heat in the heating of the charge to maintain the temperature of the material in the vessels at 750° F. or higher, removing the generated vapors and condensing therefrom constituents less volatile than motor fuel, returning the hot condensate to a converting vessel without further heating to undergo further decomposition therein, and withdrawing residual liquid from the bottom of the vessels.

11. The process of decomposing hydrocarbon materials in a substantially liquid state, which comprises heating a flowing stream of the liquid to a temperature of about 300 to 700° F., passing the heated liquid into a converting vessel under substantial super-atmospheric pressure, introducing a free oxygen containing gas into the body of the liquid, preventing loss of heat from the vessel to maintain temperature of about 750° F. or higher therein, removing the generated vapors and condensing therefrom the less volatile constituents, returning the hot condensate without further heating to the vessel to undergo further decomposition, and withdrawing residual liquid from the bottom of the vessel, in which process the generated vapors are removed from the converting vessel and are then fractionated between motor fuel as a vapor fraction and less volatile constituents as condensate.

12. The process of decomposing hydrocarbon materials in a substantially liquid state, which comprises heating a flowing stream of the liquid to a temperature of about 300 to 700° F., passing the heated liquid into a converting vessel under substantial superatmospheric pressure, to form a considerable depth of liquid therein, introducing a free oxygen containing gas at such point in the liquid as to effect substantially complete deoxygenation of the gas, preventing loss of heat from the vessel to maintain temperatures of about 750° F. or higher therein, removing the generated vapors and condensing therefrom the less volatile constituents, returning the hot condensate without further heating to the vessel to undergo further decomposition, and withdrawing residual liquid from the bottom of the vessel, in which process the generated vapors are removed from the converting vessel and are then fractionated between motor fuel as a vapor fraction and less volatile constituents as condensate.

13. The process of decomposing hydrocarbon materials in a substantially liquid state, which comprises heating a flowing stream of the liquid to a temperature of about 300 to 700° F., treating the heated liquid in a battery of converting vessels under substantial super-atmospheric pressure while maintaining a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, removing the generated vapors and condensing therefrom the less volatile constituents, returning the condensate to a converting vessel to undergo further decomposition, and withdrawing residual liquid from the bottom of the last vessel, in which process the generated vapors are removed from the converting vessels and are then fractionated between motor fuel as a vapor fraction and less volatile constituents as condensate.

14. The process of decomposing hydrocarbon materials in a substantially liquid state, which comprises heating a flowing stream of the liquid to a temperature of about 300 to 700°. F., continuously treating the heated liquid in a battery of converting vessels under substantial super-atmospheric pressure, while maintaining a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, continuously removing the generated vapors and condensing therefrom the less volatile constituents, continuously returning the condensate to a converting vessel to undergo further decomposition, and withdrawing residual liquid from the bottom of the last vessel, in which process the generated vapors are removed from the converting vessels and are then fractionated between motor fuel as a vapor fraction and less volatile constituents as condensate.

15. The process of decomposing hydrocarbon materials in a substantially liquid state, which comprises heating a flowing stream of the liquid, continuously treating the heated liquid in a battery of converting vessels under substantial super-atmospheric pressure, while maintaining a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, continuously removing the generated vapors and condnsing therefrom the less volatile constituents, continuously returning the condensate to a converting vessel to undergo further decomposition, and withdrawing residual liquid from the bottom of the last vessel, in which process the generated vapors are removed from the converting vessels and are then fractionated between motor fuel as a vapor fraction and less volatile constituents as condensate.

16. The process of decomposing hydrocarbon materials in a substantially liquid state, which comprises heating a flowing stream of the liquid to a temperature of about 300 to 700° F., continuously treating the heated liquid in a battery of converting vessels under substantial super-atmospheric pressure, while maintaining a considerable depth of liquid therein, supplying enough additional heat to each vessel to raise the temperature to about 750° F. or higher through means of the exothermic reaction of a free oxygen containing gas with the hydrocarbon material, removing the generated vapors and condensing therefrom the less volatile constituents, continuously returning the condensate to a converting vessel to undergo further decomposition, and withdrawing residual liquid from the bottom of a vessel in which process the generated vapors are removed from the converting vessels and are then fractionated between motor fuel as a vapor fraction and less volatile constituents as condensate.

17. The process of decomposing hydrocarbon materials in a substantially liquid state, which comprises heating a flowing stream of liquid to a temperature of about 300 to 700° F., continuously treating the heated liquid in a battery of heat insulated converting vessels under substantial super-atmospheric pressure, introducing a free oxygen containing gas into each vessel to react exothermically with the hydrocarbon material therein, whereby enough additional heat is supplied to each vessel to raise the temperature to about 750° F. or higher, removing the generated vapors and condensing therefrom the less volatile constituents, and cyclically returning the condensate while still under pressure for further treatment, in which process the generated vapors are removed from the converting vessels and are then fractionated between motor fuel as a vapor fraction and less volatile constituents as condensate.

18. The process of decomposing hydrocarbon materials in a substantially liquid state, which comprises heating a flowing stream of the liquid to a temperature of about 300 to 700° F., passing the heated liquid into a converting vessel under substantial super-atmospheric pressure, introducing a free oxygen containing gas into the body of the liquid, preventing loss of heat from the vessel to maintain temperature of about 750° F. or higher therein, removing the generated vapors and condensing therefrom the less volatile constituents, returning the hot condensate without further heating to the vessel to undergo further decomposition, and withdrawing residual liquid from the bottom of the vessel, in which process the generated vapors are removed from the converting vessel and treated to produce a motor fuel fraction.

19. The process of decomposing hydrocarbon materials in a substantially liquid state, which comprises heating a flowing stream of the liquid to a temperature of about 300 to 700° F., passing the heated liquid into a converting vessel under substantial super-atmospheric pressure, introducing a free oxygen containing gas into the body of the liquid, preventing loss of heat from the vessel to maintain temperature of about 750° F. or higher therein, removing the generated vapors and condensing therefrom the less volatile constituents, returning the hot condensate without further heating to the vessel to undergo further decomposition, and withdrawing residual liquid from the bottom of the vessel, in which process the generated vapors are removed from the converting vessel and treated to produce a fraction containing carbonyl derivatives.

20. The process of decomposing hydrocarbon materials in a substantially liquid state, which comprises heating a flowing stream of the liquid to a temperature of about 300 to 700° F., passing the heated liquid into a converting vessel under substantial super-atmospheric pressure, introducing a free oxygen containing gas into the body of the liquid, preventing loss of heat from the vessel to maintain temperature of about 750° F. or higher therein, removing the generated vapors and condensing therefrom the less volatile constituents, returning the hot condensate without further heating to the vessel to undergo further decomposition, and withdrawing residual liquid from the bottom of the vessel, in which process the generated vapors are removed from the converting vessel and treated to produce an organic acid fraction.

21. A process of decomposing hydrocarbon materials in a substantially liquid state and obtaining valuable products therefrom which comprises heating a flowing stream of the liquid, passing the heated liquid into a converting zone under substantial superatmospheric pressure, introducing an oxygen-containing gas into the body of the liquid, maintaining the temperature of the liquid in the converting zone of about 750° F. or higher therein, to produce vapors, removing the generated vapors and condensing therefrom the less volatile constituents to form a condensate, fractionating said condensate to form lighter and heavier fractions, returning a heavier fraction to the converting zone to undergo further decomposition, and withdrawing residual liquid from the bottom of the converting zone.

22. A process of decomposing hydrocarbon materials in a substantially liquid state and obtaining valuable products therefrom which comprises heating a flowing stream of the liquid to about 400° F., passing the heated liquid into a converting zone under substantial superatmospheric pressure, introducing an oxygen-containing gas into the body of the liquid, maintaining the temperature of the liquid in the converting zone of about 750° F. or higher therein, to produce vapors, removing the generated vapors and condensing therefrom the less volatile constituents to form a condensate, fractionating said condensate to form lighter and heavier fractions, returning a heavier fraction to the converting zone to undergo further decomposition, and withdrawing residual liquid from the bottom of the converting zone.

23. A process of decomposing hydrocarbon materials in a substantially liquid state and obtaining valuable products therefrom, which comprises heating a flowing stream of the liquid, passing the heated liquid into a converting zone under substantial superatmospheric pressure, introducing an oxygen-containing gas into the body of the liquid, maintaining the temperature of the liquid in the converting zone of about 750° F. or higher therein, to produce vapors, removing the generated vapors and condensing therefrom the less volatile constituents to form a condensate, fractionating said condensate to form a lighter fraction constituting a motor fuel, and a heavier fraction, and recovering said motor fuel, returning a heavier fraction to the converting zone to undergo further decomposition, and withdrawing residual liquid from the bottom of the converting zone.

24. A process of decomposing hydrocarbon materials in a substantially liquid state and obtaining valuable products therefrom which comprises heating a flowing stream of the liquid, continuously passing the heated liquid into a converting zone under substantial superatmospheric pressure to form a considerable depth of liquid therein, introducing a free oxygen-containing gas into the liquid in the conversion zone at such point therein as to effect substantially complete deoxygenation of the gas, maintaining the temperature in the converting zone of about 750° F. or higher therein, to produce vapors, removing the generated vapors and condensing therefrom the less volatile constituents to form a condensate, fractionating said condensate to form lighter and heavier fractions, returning a heavier fraction to the converting zone to undergo further decomposition, and withdrawing residual liquid from the bottom of the conversion zone.

25. A process of decomposing hydrocarbon materials in a substantially liquid state and obtaining valuable products therefrom which comprises pre-heating the liquid, passing the pre-heated liquid into a converting zone under substantial superatmospheric pressure, introducing an oxygen-containing gas into the body of the liquid, maintaining the temperature of the liquid in the converting zone of about 750° F. or higher therein to produce vapors, condensing from the produced vapors the less volatile constituents to form a condensate, fractionating said condensate to form lighter and heavier fractions, returning a heavier fraction to the converting zone to undergo further decomposition, and withdrawing residual liquid from the bottom of the conversion zone.

26. A process of decomposing hydrocarbon materials in a substantially liquid state and obtaining valuable products therefrom which comprises passing a flowing stream of the liquid into a converting zone under substantial superatmospheric pressure, introducing an oxygen-containing gas into the body of the liquid, maintaining the temperature of the liquid in the converting zone of about 750° F. or higher therein to produce vapors, removing the generated vapors and condensing therefrom the less volatile constituents to form a condensate, fractionating said condensate to form lighter and heavier fractions, returning a heavier fraction to the converting zone to undergo further decomposition, and withdrawing residual liquid from the bottom of the converting zone.

WILLIAM B. D. PENNIMAN.

CERTIFICATE OF CORRECTION.

Patent No. 2,044,014. June 16, 1936.

WILLIAM B. D. PENNIMAN.

It is hereby certified that error appears in the printed specification of the above numbered patent requiring correction as follows: Page 2, first column, line 65, for "calorfic" read calorific; page 5, second column, line 58, for "block-off" read blow-off; page 6, first column, line 62, in the table, for "33%" read 35%; page 7, first column, line 8, for "combines" read combined; page 8, second column, line 27, claim 5, for "heating" read treating; page 10, first column, line 7, claim 15, for "condnsing" read condensing; and second column, lines 6 and 7, claim 19, for "introtroducing" read introducing; and that the said Letters Patent should be read with these corrections therein that the same may conform to the record of the case in the Patent Office.

Signed and sealed this 12th day of October, A. D. 1937.

Henry Van Arsdale.
(Seal) Acting Commissioner of Patents.

CERTIFICATE OF CORRECTION.

Patent No. 2,044,014.                                                June 16, 1936.

WILLIAM B. D. PENNIMAN.

It is hereby certified that error appears in the printed specification of the above numbered patent requiring correction as follows: Page 2, first column, line 65, for "calorfic" read calorific; page 5, second column, line 58, for "block-off" read blow-off; page 6, first column, line 62, in the table, for "33%" read 35%; page 7, first column, line 8, for "combines" read combined; page 8, second column, line 27, claim 5, for "heating" read treating; page 10, first column, line 7, claim 15, for "condnsing" read condensing; and second column, lines 6 and 7, claim 19, for "introtroducing" read introducing; and that the said Letters Patent should be read with these corrections therein that the same may conform to the record of the case in the Patent Office.

Signed and sealed this 12th day of October, A. D. 1937.

(Seal)

Henry Van Arsdale.
Acting Commissioner of Patents.